S. B. LADD.
METHOD OF TREATING SLAG.
APPLICATION FILED JUNE 2, 1906.
929,142.
Patented July 27, 1909.
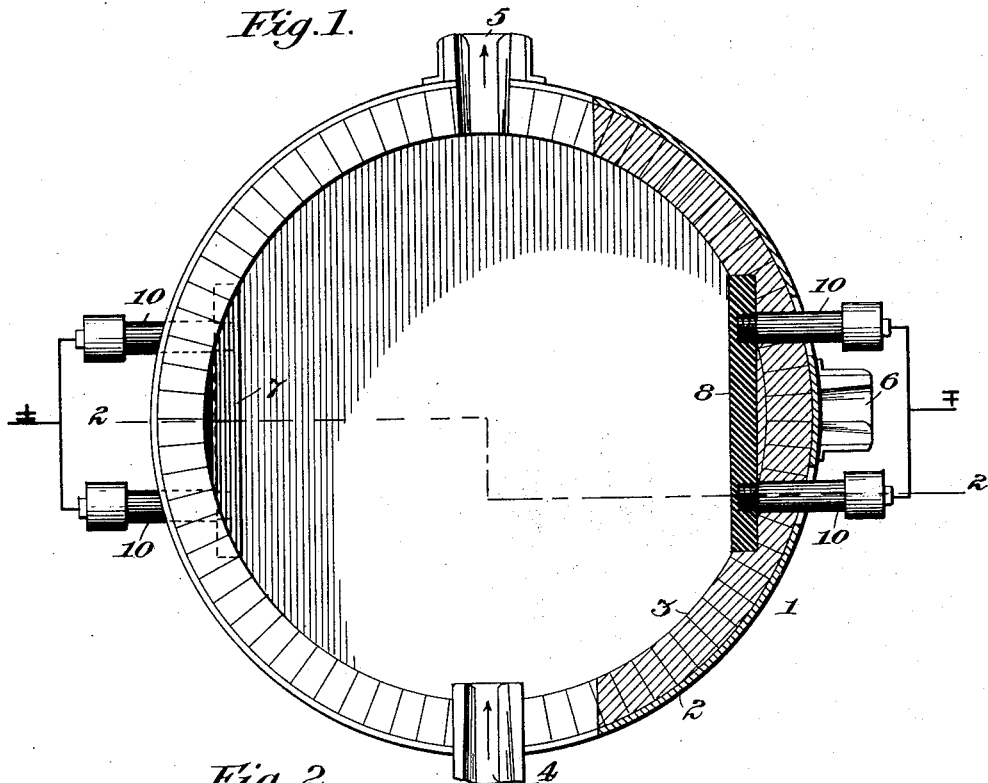
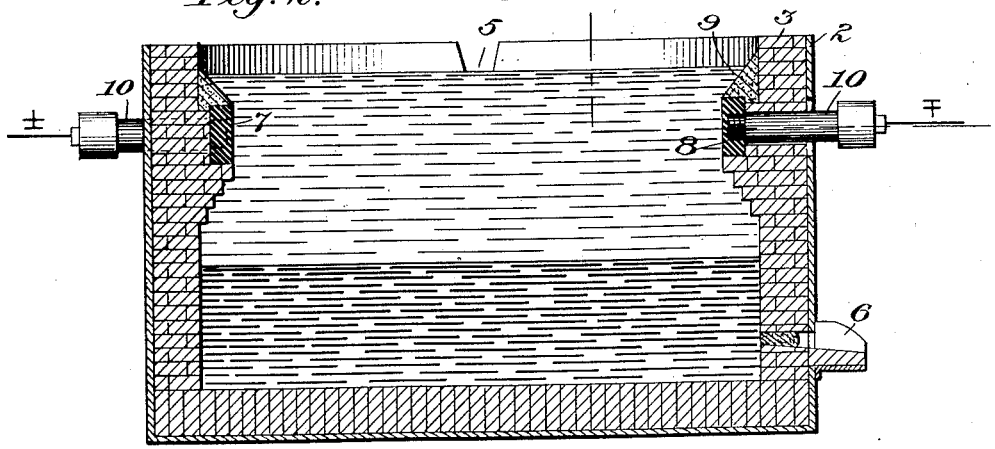
Witnesses:
Inventor:
Story B. Ladd,
by Byrnes & Townsend,
Att'ys.

UNITED STATES PATENT OFFICE.

STORY B. LADD, OF WASHINGTON, DISTRICT OF COLUMBIA.

METHOD OF TREATING SLAG.

No. 929,142.　　　Specification of Letters Patent.　　　Patented July 27, 1909.

Application filed June 2, 1906. Serial No. 319,875.

*To all whom it may concern:*

Be it known that I, STORY B. LADD, a citizen of the United States, residing at Washington, in the District of Columbia, have invented certain new and useful Improvements in Methods of Treating Slag, of which the following is a specification.

This invention is a method of treating slag for the purpose of recovering therefrom mechanically-suspended or retained metals or metal-bearing compounds.

The method is more particularly applicable to the separation and recovery of copper or copper matte from slags produced in the usual operation of copper smelting. Such slags usually carry from 0.3 to 0.5 per cent., or even more, by weight, of copper which cannot be effectively separated therefrom by simple settling, either because the slag is not sufficiently fluid to permit the subsidence of the finer particles of copper or matte; or if initially sufficiently fluid for this purpose, because owing to loss of heat by radiation it becomes viscid before the subsidence is complete. I have discovered that a substantially complete separation of the metal may be effected by imparting to the slag sufficient heat to maintain it in such fluid condition as will permit relatively rapid subsidence of the metallic values, the heating being continued until such subsidence is complete or has proceeded as far as commercially practicable. In practice the operation is preferably continuous, the slag and matte being tapped from the smelting furnace into a settling vessel provided with means for imparting heat to the slag and means for withdrawing the separated matte or metal. The treated slag is permitted to overflow from the settling vessel at a rate proportionate to the rate at which it is supplied thereto.

For a full understanding of the invention reference is made to the accompanying drawings showing one form of apparatus for carrying the same into effect.

Figure 1 is a plan view, partly in horizontal section, of a settling vessel provided with electrical heating means; and Fig. 2 is a vertical section on line 2—2 of Fig. 1.

1 represents a tank or settling vessel, preferably cylindrical and comparatively shallow. The vessel shown comprises a sheet-steel body 2 interiorly lined with refractory brick 3. An inlet 4 for the slag and matte and an outlet 5 for the treated slag are provided, preferably at diametrically opposite points at the normal slag level.

6 represents a tap for matte.

Oppositely disposed electrodes 7, 8 are provided intermediate the inlet and outlet, and somewhat below the normal slag level in order that the heat may be applied beneath the surface of the body of slag and that the current may not be interrupted when matte is tapped from the settling vessel. These electrodes preferably consist of blocks of carbon or graphite, supported by the lining 3 of the settling vessel and protected by a luting 9 of clay or other suitable material. Electrical connection is established through rods 10 of metal or of graphite screwed or otherwise secured to the blocks 7, 8 and extending through the walls of the tank and insulated therefrom. A double advantage is secured by applying the heat beneath the surface of the body of slag as above described: First, the surface remains comparatively cool and may even crust over except in immediate proximity to the inlet, thereby preventing serious loss of heat by radiation and rendering it practicable to effectively separate the metal or matte in uncovered vessels; second, this mode of application of the heat insures an even fluidity throughout the main body of slag, whereas an application of heat from the surface may render the upper portion of the slag relatively fluid, while the lower portion remains too viscous for effectively settling. In such case matte separated from the upper portion of the slag is merely concentrated in the lower portion, and is not recovered.

In operation the slag and matte are admitted at 4 to the settling vessel 1, and a separation occurs therein, the matte collecting beneath the slag and being withdrawn at intervals through the tap 6, and the slag being permitted to overflow at 5. Either a direct or alternating current may be caused to traverse the slag between the electrodes 7, 8, the volume of current being sufficient to maintain the slag in a comparatively fluid condition and to facilitate the separation of the values therefrom. The rate of subsidence of the metal-bearing particles is in general proportionate to the fluidity of the slag and to its temperature, and for this reason I prefer to superheat the slag, that is to say, to impart to it sufficient heat to maintain it at a higher temperature than that at which it is received from the smelting furnace. By so superheating the slag a commercially sufficient separation of the values may be secured in apparatus of smaller capacity than would otherwise be required.

I do not limit myself to the use of heating means substantially as shown, for it will be understood that these may be variously modified; for instance, the heat may be applied to the slag by means of a resister traversing the same or in proximity thereto. The heat of the settling vessel may be economized by checking radiation therefrom by known means, as by the use of a suitable cover and of appropriate coverings for the radiating surfaces; or the heating current may be so applied as to permit the formation of a heat-retaining crust upon the exposed surface of the slag.

I claim:—

1. The method of treating slag to separate values therefrom which consists in applying heat beneath the surface of a body of slag and thereby maintaining it in a fluid condition for such time as is required to effect a substantially complete subsidence of the metallic values, substantially as described.

2. The method of treating slag to separate values therefrom which consists in transmitting an electric current through a body of slag and thereby maintaining said body in a fluid condition for such time as is required to effect a substantially complete subsidence of the metallic values, substantially as described.

3. The method of treating slag to separate values therefrom which consists in applying heat beneath the surface of a flowing body of slag and thereby maintaining it in a fluid condition for such time as is required to effect a substantially complete subsidence of the metallic values, substantially as described.

4. The method of treating slag to separate values therefrom which consists in transmitting an electric current through a flowing body of slag in a direction transverse to its line of flow and thereby maintaining it in a fluid condition for such time as is required to effect a substantially complete subsidence of the metallic values, substantially as described.

5. The method of treating slag to separate values therefrom which consists in transmitting an electric current through a flowing body of slag in a direction transverse to its line of flow, thereby superheating the slag, and permitting the metallic values to subside, substantially as described.

In testimony whereof, I affix my signature in presence of two witnesses.

STORY B. LADD.

Witnesses:
 EUGENE A. BYRNES,
 A. F. TIBBETTS.